(12) United States Patent
Khakhalev

(10) Patent No.: US 8,433,433 B2
(45) Date of Patent: Apr. 30, 2013

(54) SYSTEM AND METHOD FOR DETERMINING WHETHER AN ULTRASONIC HORN IS ALIGNED WITH AN ANVIL

(75) Inventor: Alex Khakhalev, Troy, MI (US)

(73) Assignee: LG Chem, Ltd., Seoul (KR)

( * ) Notice: Subject to any disclaimer, the term of this patent is extended or adjusted under 35 U.S.C. 154(b) by 330 days.

(21) Appl. No.: 12/970,066

(22) Filed: Dec. 16, 2010

(65) Prior Publication Data

US 2012/0158168 A1 Jun. 21, 2012

(51) Int. Cl.
*G06F 17/00* (2006.01)
*B29C 65/08* (2006.01)

(52) U.S. Cl.
USPC ......... 700/108; 700/279; 228/1.1; 228/110.1; 156/73.1; 156/378

(58) Field of Classification Search .................. 700/108, 700/212, 279; 228/1.1, 110.1; 156/73.1, 156/64, 378, 580.1, 580.2
See application file for complete search history.

(56) References Cited

U.S. PATENT DOCUMENTS

| 2010/0276086 A1* | 11/2010 | Oblak et al. .................. 156/378 |
| 2011/0108181 A1* | 5/2011 | Cai et al. .......................... 156/64 |
| 2011/0308736 A1* | 12/2011 | Scheuerman et al. ........ 156/378 |

FOREIGN PATENT DOCUMENTS

WO WO 97/01432 * 1/1997

* cited by examiner

*Primary Examiner* — Jeffrey A Gaffin
*Assistant Examiner* — Steven Garland
(74) *Attorney, Agent, or Firm* — Buckert Patent & Trademark Law Firm, P.C.

(57) ABSTRACT

A system and a method for determining whether an ultrasonic horn is aligned with an anvil of an ultrasonic welding system are provided. The first and second accelerometer sensors generate first and second signals indicative of first and second accelerations of first and second positions on a bracket coupled to the anvil when the ultrasonic horn is vibrating and contacting the anvil. The system further includes a microprocessor that receives the first and second signals. The microprocessor determines a difference between an amplitude of the first signal at a first time and an amplitude of the second signal at the first time. The microprocessor stores a first identifier value in a memory device indicating that the ultrasonic horn is aligned with the anvil if the difference between the amplitude of the first signal and the amplitude of the second signal is less than or equal to a threshold value.

12 Claims, 6 Drawing Sheets

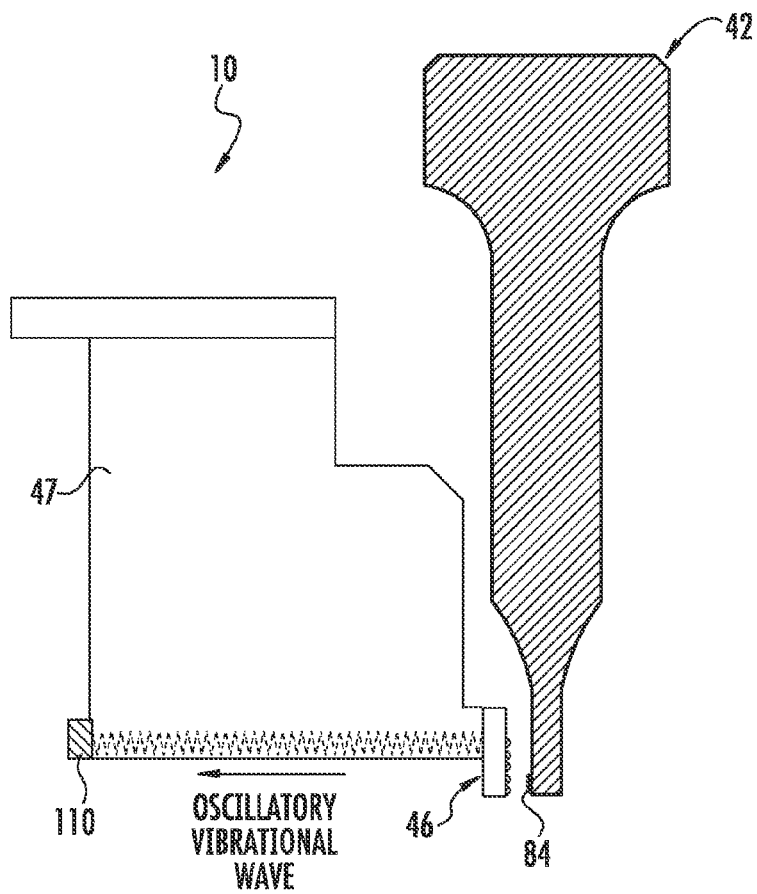
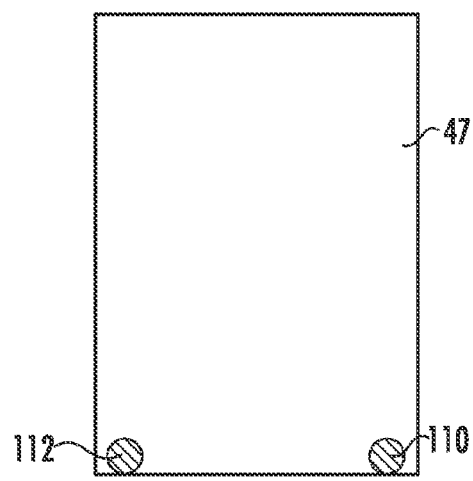

SYSTEM AND METHOD FOR DETERMINING WHETHER AN ULTRASONIC HORN IS ALIGNED WITH AN ANVIL

BACKGROUND

Ultrasonic welding systems have been utilized to form weld joints. The ultrasonic welding system may utilize an ultrasonic horn and a stationary anvil. However, it is difficult to align the ultrasonic horn with the anvil that may result weld joints having undesirable structural characteristics.

Accordingly, the inventor herein has recognized a need for an improved system and method for determining whether an ultrasonic horn is aligned with an anvil that reduces and/or minimizes the above-mentioned deficiency.

SUMMARY

A system for determining whether an ultrasonic horn is aligned with an anvil of an ultrasonic welding system in accordance with an exemplary embodiment is provided. The system includes first and second accelerometer sensors that are disposed at first and second positions, respectively, on a bracket coupled to the anvil. The first and second accelerometer sensors are configured to generate first and second signals, respectively, indicative of first and second accelerations, respectively, of the first and second positions, respectively, when the ultrasonic horn is vibrating and contacting the anvil. The system further includes a microprocessor operably coupled to the first and second accelerometer sensors configured to receive the first and second signals. The microprocessor is further configured to determine a difference between an amplitude of the first signal at a first time and an amplitude of the second signal at the first time. The microprocessor is further configured to store a first identifier value in a memory device indicating that the ultrasonic horn is aligned with the anvil if the difference between the amplitude of the first signal and the amplitude of the second signal is less than or equal to a threshold value.

A method for determining whether an ultrasonic horn is aligned with an anvil of an ultrasonic welding system in accordance with another exemplary embodiment is provided. The method includes generating first and second signals utilizing first and second accelerometer sensors, respectively, disposed at first and second positions, respectively, on a bracket coupled to the anvil, that are indicative of first and second accelerations, respectively, of first and second positions, respectively, when the ultrasonic horn is vibrating and contacting the anvil. The method further includes receiving the first and second signals at a microprocessor. The method further includes determining a difference between an amplitude of the first signal at a first time and an amplitude of the second signal at the first time utilizing the microprocessor. The method further includes storing a first identifier value in a memory device indicating that the ultrasonic horn is aligned with the anvil if the difference between the amplitude of the first signal and the amplitude of the second signal is less than or equal to a threshold value, utilizing the microprocessor.

BRIEF DESCRIPTION OF THE DRAWINGS

FIG. 3 is a side view of an ultrasonic welding device utilized in the ultrasonic welding system of FIG. 1;

FIG. 4 is a rear view of a bracket utilized in the ultrasonic welding device of FIG. 3;

DETAILED DESCRIPTION

Figure 1:
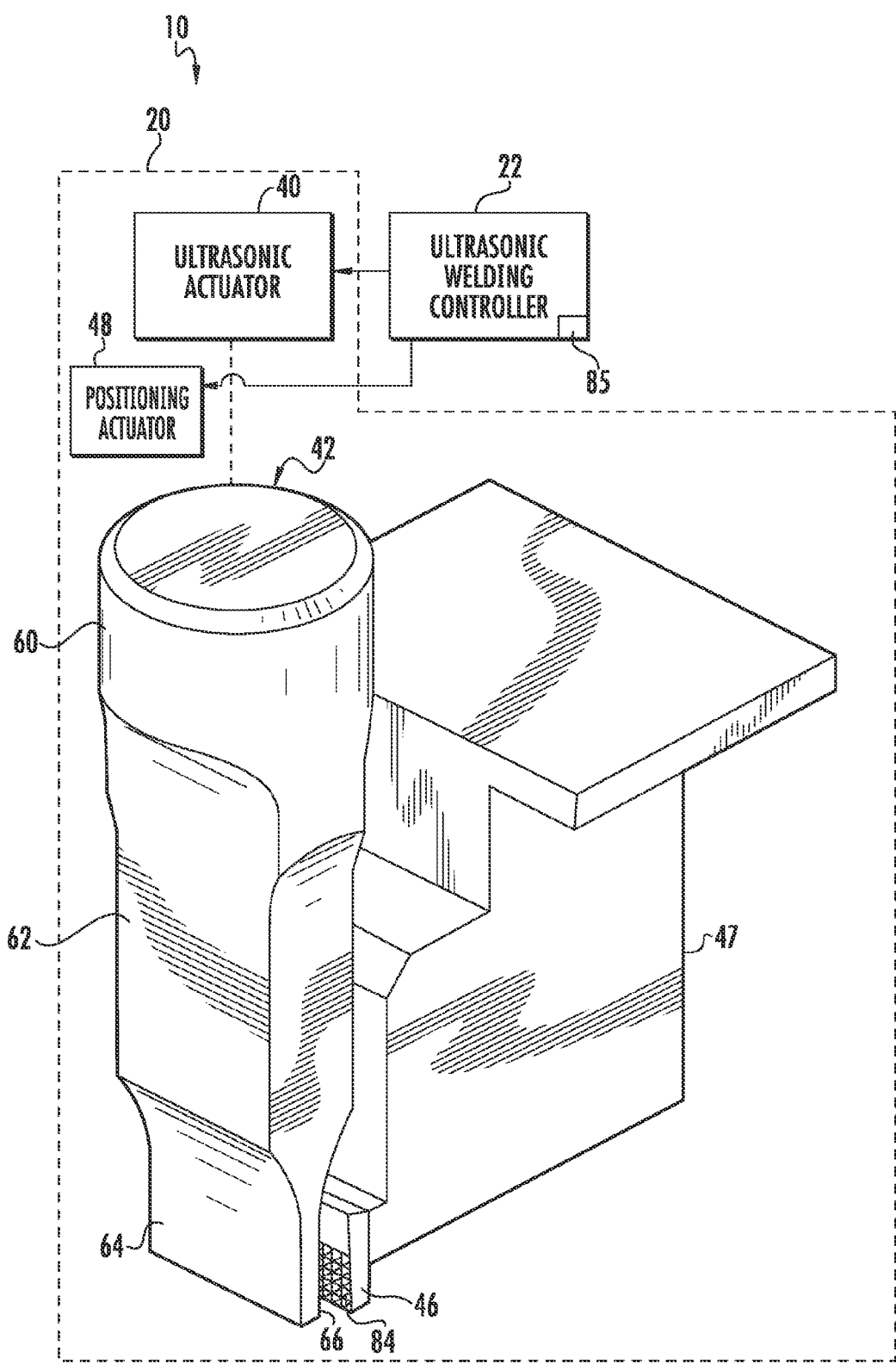
FIG. 1 is a schematic of an ultrasonic welding system.

Referring to FIG. 1, an ultrasonic welding system 10 for forming weld joints in components is illustrated. The ultrasonic welding system 10 includes an ultrasonic welding device 20 and an ultrasonic welding controller 22.

The ultrasonic welding device 20 is configured to form weld joints in components such as electrical terminals of battery cells. The ultrasonic welding device 20 includes an ultrasonic actuator 40, an ultrasonic horn 42, an anvil 46, a bracket 47, and a positioning actuator 48.

The ultrasonic actuator 40 is configured to vibrate the ultrasonic horn 42 in response to receiving control signals from the ultrasonic welding controller 22. The ultrasonic actuator 40 is operably coupled to the ultrasonic horn 42.

The ultrasonic horn 42 is configured to contact a component (e.g., an electrical terminal of a battery cell) disposed between the horn 42 and the anvil 46 to form one or more weld joints on the component when the horn 42 is vibrating. The ultrasonic horn 42 includes a head portion 60, a central portion 62, and a tip portion 64. The head portion 60 is operably coupled to the ultrasonic actuator 40. The central portion 62 is coupled between the head portion 60 and the tip portion 64. The tip portion 64 includes a knurled region 66 that faces the anvil 46. In one exemplary embodiment, the ultrasonic horn 42 is constructed of tool steel such as M2 steel for example.

The anvil 46 is configured to contact a component (e.g., an electrical terminal of a battery cell) disposed between the anvil 46 and the ultrasonic horn 42. The anvil 46 includes a knurled region 84 disposed proximate to the knurled region 66 of the ultrasonic horn 42. In one exemplary embodiment, the anvil 46 is constructed of M2 steel. Of course, in alternative embodiments, the anvil 46 could be constructed of other materials known to those skilled in the art. The anvil 46 is operably coupled to the bracket 47 that holds the anvil 46 thereon. In one exemplary embodiment, the bracket 47 can also be constructed of M2 steel. Of course, in alternative embodiments, the bracket 47 could be constructed of other materials known to those skilled in the art.

The positioning actuator 48 is configured to move the ultrasonic horn 42 axially toward the anvil 46 and away from the anvil 46 in response to respective control signals from the ultrasonic welding controller 22. The positioning actuator 48 is operably coupled to the ultrasonic horn 42.

The ultrasonic welding controller 22 includes an internal microprocessor 85 configured to generate control signals to induce the ultrasonic actuator 40 to vibrate. Further, the ultrasonic welding controller 22 is configured to generate control signals to induce the positioning actuator 48 to move the ultrasonic horn 42 axially toward the anvil 46 and away from the anvil 46.

Figure 2:
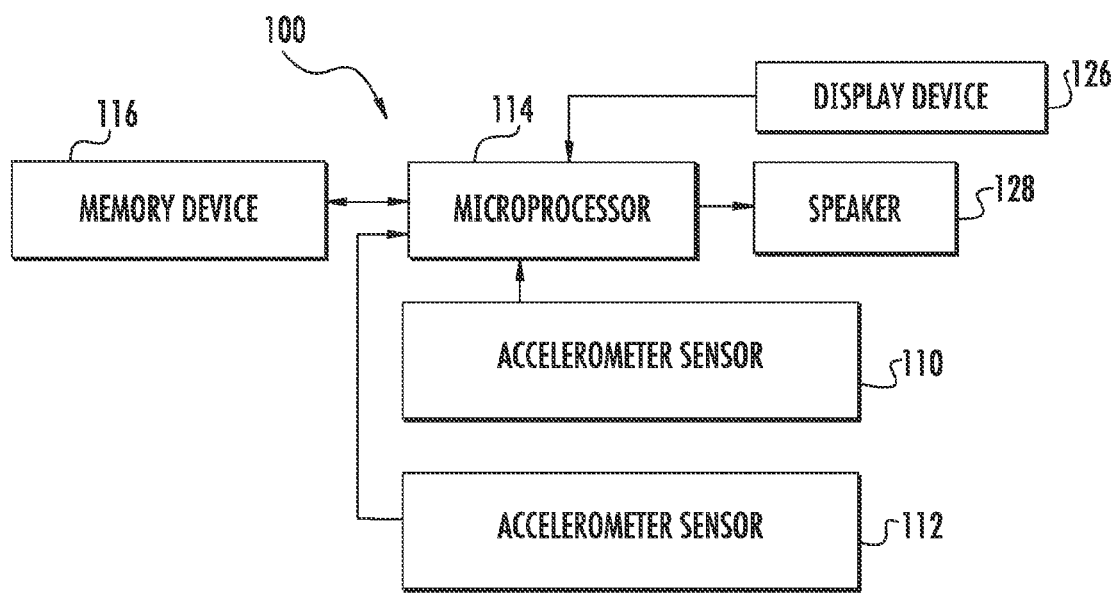
FIG. 2 is a block diagram of a system for determining whether an ultrasonic horn is aligned with an anvil of the ultrasonic welding system of FIG. 1, in accordance with an exemplary embodiment.
Figure 5:
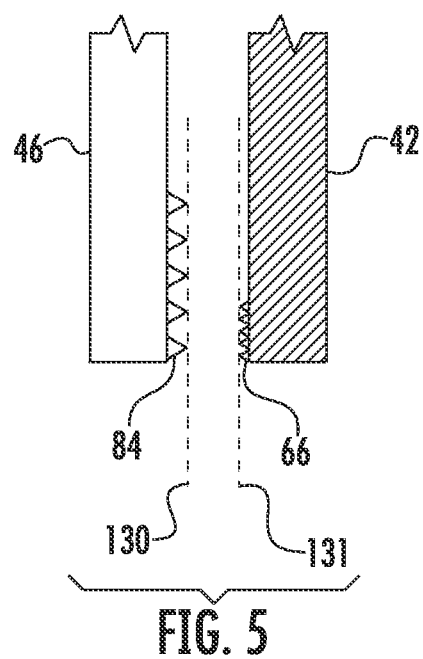
FIG. 5 is a schematic of a portion of an anvil and a portion of an ultrasonic horn utilized in the ultrasonic welding device of FIG. 3.

Referring to FIGS. 1, 2 and 5, a system 100 for determining whether the ultrasonic horn 42 is aligned with the anvil 46 in accordance with an exemplary embodiment will be described. When the ultrasonic horn 42 is aligned with the anvil 46, a plane 130 extending across outermost portions of the knurled region 84 of the anvil 46 is substantially parallel to a plane 131 extending across outermost portions of the knurled region 66 on the ultrasonic horn 42. Alternately, if the planes 130, 131 are not substantially parallel to one another, the ultrasonic horn 42 is not aligned with the anvil 46. The system 100 includes accelerometer sensors 110, 112, a microprocessor 114, a memory device 116, a display device 126, and an electrical speaker 128.

Referring to FIGS. 2-6, the accelerometer sensors 110, 112 are disposed at first and second positions, respectively, on the bracket 47 that is coupled to the anvil 46. The accelerometer sensors 110, 112 are configured to generate first and second signals 140, 142, respectively, indicative of first and second accelerations, respectively, of the first and second positions, respectively, when the ultrasonic horn 42 is vibrating and contacting the anvil 46. In particular, when the ultrasonic horn 42 is vibrating and the knurled region 66 contacts the knurled region 84 of the anvil 46, an oscillatory vibrational wave (shown in FIG. 3) is transmitted through the anvil 46 to the bracket 47. Accordingly, first and second positions on the bracket 47 are accelerated by the oscillatory vibrational wave. In one exemplary embodiment, the first and second positions are at first and second ends of the bracket 47. Of course, the first and second positions could be at other locations. If the ultrasonic horn 42 is aligned with the anvil 46, the first and second accelerations of the first and second positions, respectively, of the bracket 47 should closely match one another as will be discussed in greater detail below. Otherwise, the ultrasonic horn 42 is not aligned with the anvil 46.

The microprocessor 114 is operably coupled to the accelerometer sensors 110, 112, the memory device 116, the display device 126, and the electrical speaker 128. The microprocessor 114 is configured to receive the first and second signals 140, 142 (shown in FIG. 6) from the accelerometer sensors 110, 112. The microprocessor 144 is further configured to compare an amplitude of the first signal 140 at a first time (e.g., $T_1$) to an amplitude of the second signal 142 at the first time.

Figure 6:
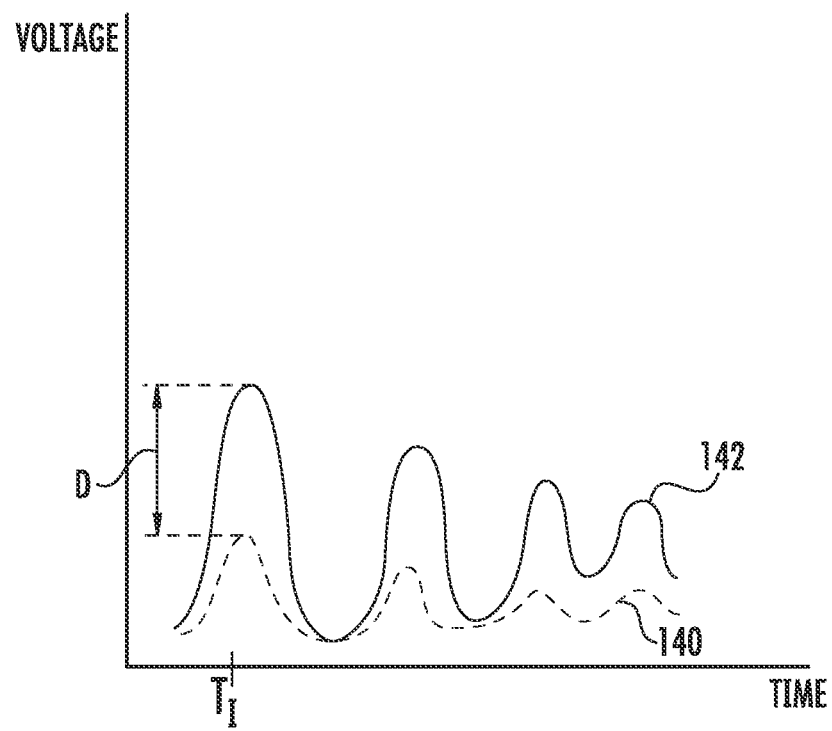
FIG. 6 is a schematic of first and second signals generated by first and second accelerometer sensors utilized in the system of FIG. 2.

If a difference between the amplitude of the first signal 140 and the amplitude of the second signal 142, shown as D in FIG. 6, is less than or equal to a threshold value, the microprocessor 114 is configured to store a first identifier value in the memory device 116 indicating that the ultrasonic horn 42 is aligned with the anvil 46. Also, the microprocessor 114 is configured to induce the display device 126 to display a first message indicating that the ultrasonic horn 42 is aligned with the anvil 46. Further, the microprocessor 114 is configured to induce the electrical speaker 128 to emit a first sound indicating that the ultrasonic horn 42 is aligned with the anvil 46.

Alternately, if a difference between the amplitude of the first signal 140 and the amplitude of the second signal 142, shown as D in FIG. 6, is greater than a threshold value, the microprocessor 114 is configured to store a second identifier value in the memory device 116 indicating that the ultrasonic horn 42 is not aligned with the anvil 46. Also, the microprocessor 114 is configured to induce the display device 126 to display a second message indicating that the ultrasonic horn 42 is not aligned with the anvil 46. Further, the microprocessor 114 is configured to induce the electrical speaker 128 to emit a second sound indicating that the ultrasonic horn 42 is not aligned with the anvil 46.

Figure 7:
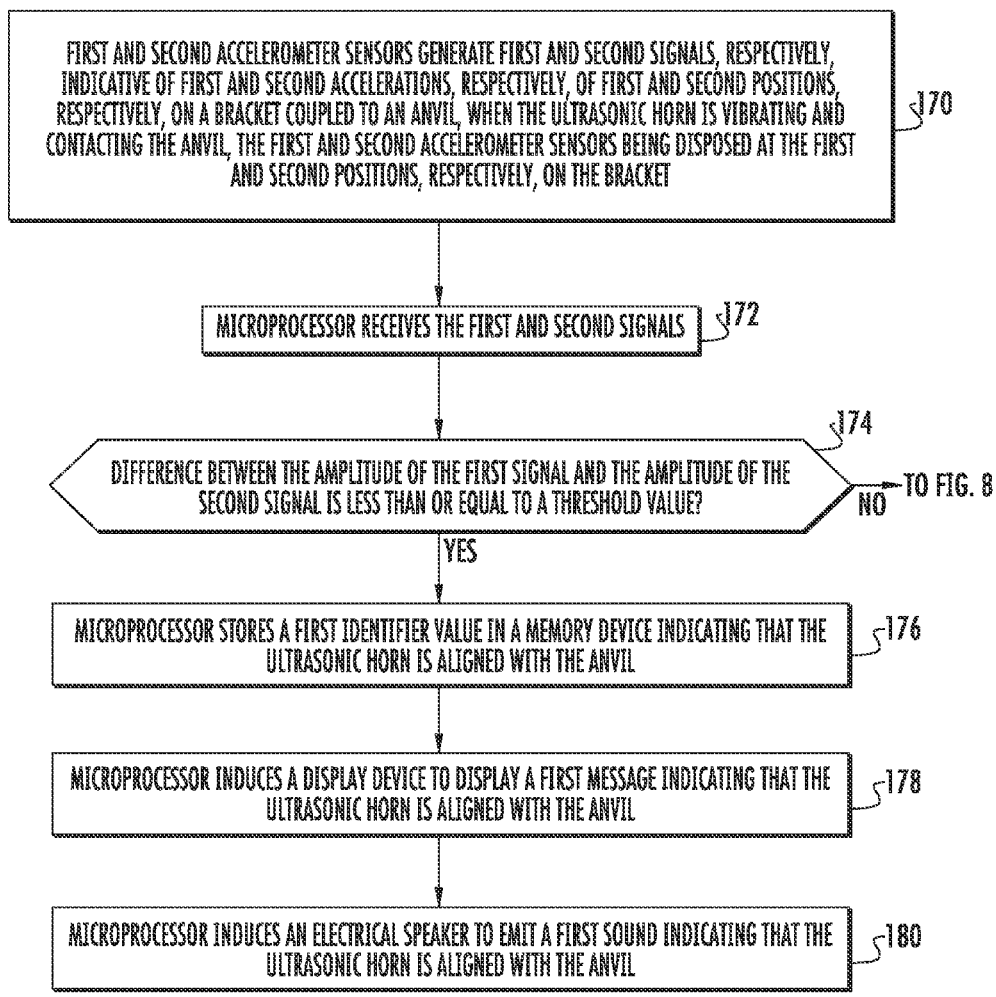
FIGS. 7 and 8 are flowcharts of a method for determining whether an ultrasonic horn is aligned with an anvil of the ultrasonic welding system of FIG. 1, in accordance with another exemplary embodiment.
Figure 8:
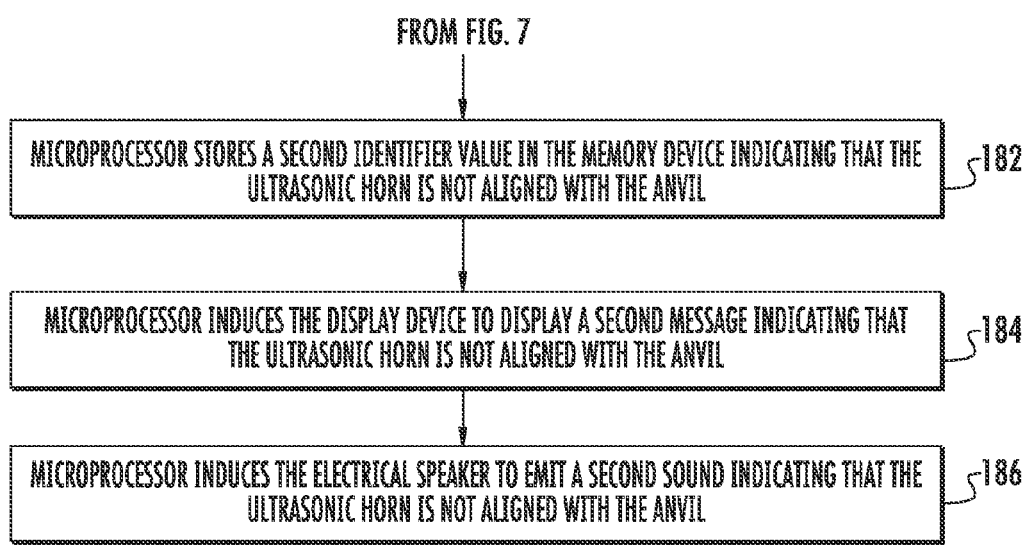

Referring to FIGS. 2, 7 and 8, a flowchart of a method for determining whether the ultrasonic horn 42 is aligned with an anvil 46 of the ultrasonic welding system 10 in accordance with another exemplary embodiment will now be explained.

At step 170, the accelerometer sensors 110, 112 generate first and second signals 140, 142, respectively, indicative of first and second accelerations, respectively, of first and second positions, respectively, on the bracket 47 coupled to the anvil 46, when the ultrasonic horn 42 is vibrating and contacting the anvil 46. The accelerometer sensors 110, 112 are disposed at the first and second positions, respectively, on the bracket 47.

Next at step 172, the microprocessor 114 receives the first and second signals 140, 142.

Next at step 174, the microprocessor 114 makes a determination as to whether a difference between the amplitude of the first signal 140 and the amplitude of the second signal 142 is less than or equal to a threshold value. If the value of step 174 equals "yes", the method advances to step 176. Otherwise, the method advances to step 182.

At step 176, the microprocessor 114 stores a first identifier value in the memory device 116 indicating that the ultrasonic horn 42 is aligned with the anvil 46.

Next at step 178, the microprocessor 114 induces the display device 126 to display a first message indicating that the ultrasonic horn 42 is aligned with the anvil 46.

Next at step 180, the microprocessor 114 induces the electrical speaker 128 to emit a first sound indicating that the ultrasonic horn 42 is aligned with the anvil 46.

Referring again to step 174, if the value of step 174 equals "no", the method advances to step 182.

At step 182, the microprocessor 114 stores a second identifier value in the memory device 116 indicating that the ultrasonic horn 42 is not aligned with the anvil 46.

Next at step 184, the microprocessor 114 induces the display device 126 to display a second message indicating that the ultrasonic horn 42 is not aligned with the anvil 46.

Next at step 186, the microprocessor 114 induces the electrical speaker 128 to emit a second sound indicating that the ultrasonic horn 42 is not aligned with the anvil 46.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

I claim:

1. A system for determining whether an ultrasonic horn is aligned with an anvil of an ultrasonic welding system, comprising:

first and second accelerometer sensors being disposed at first and second positions, respectively, on a bracket coupled to the anvil, the first and second accelerometer sensors generating first and second signals, respectively, indicative of first and second accelerations, respectively, of the first and second positions, respectively, in response to the ultrasonic horn vibrating and contacting the anvil; and a microprocessor operably coupled to the first and second accelerometer sensors receiving the first and second signals, the microprocessor determining a difference between an amplitude of the first signal at a first time and an amplitude of the second signal at the first time, the microprocessor storing a first identifier value in a memory device indicating that the ultrasonic horn is aligned with the anvil in response to the difference between the amplitude of the first signal and the amplitude of the second signal being less than or equal to a threshold value.

2. The system of claim 1, wherein the microprocessor is further configured to store a second identifier value in the memory device indicating that the ultrasonic horn is not aligned with the anvil in response to the difference between the amplitude of the first signal and the amplitude of the second signal being greater than the threshold value.

3. The system of claim 1, wherein the ultrasonic horn is aligned with the anvil when a plane extending across outermost portions of a knurled region of the ultrasonic horn is disposed substantially parallel to another plane extending across outermost portions of another knurled region of the anvil.

4. The system of claim 1, wherein the first and second positions are first and second ends of the bracket, respectively.

5. The system of claim 1, wherein the microprocessor is further configured to induce a display device to display a message indicating that the ultrasonic horn is aligned with the anvil in response to the difference between the amplitude of the first signal and the amplitude of the second signal being less than or equal to the threshold value.

6. The system of claim 1, wherein the microprocessor is further configured to induce an electrical speaker to emit a sound indicating that the ultrasonic horn is aligned with the anvil in response to the difference between the amplitude of the first signal and the amplitude of the second signal being less than or equal to the threshold value.

7. A method for determining whether an ultrasonic horn is aligned with an anvil of an ultrasonic welding system, comprising:

generating first and second signals utilizing first and second accelerometer sensors, respectively, disposed at first and second positions, respectively, on a bracket coupled to the anvil, that are indicative of first and second accelerations, respectively, of the first and second positions, respectively, in response to the ultrasonic horn vibrating and contacting the anvil; and receiving the first and second signals at a microprocessor; determining a difference between an amplitude of the first signal at a first time and an amplitude of the second signal at the first time utilizing the microprocessor; and storing a first identifier value in a memory device indicating that the ultrasonic horn is aligned with the anvil in response to the difference between the amplitude of the first signal and the amplitude of the second signal being less than or equal to a threshold value, utilizing the microprocessor.

8. The method of claim 7, further comprising storing a second identifier value in the memory device indicating that the ultrasonic horn is not aligned with the anvil in response to the difference between the amplitude of the first signal and the amplitude of the second signal being greater than the threshold value, utilizing the microprocessor.

9. The method of claim 7, wherein the ultrasonic horn is aligned with the anvil when a plane extending across outermost portions of a knurled region of the ultrasonic horn is disposed substantially parallel to another plane extending across outermost portions of another knurled region of the anvil.

10. The method of claim 7, wherein the first and second positions are first and second ends of the bracket, respectively.

11. The method of claim 7, further comprising displaying a message on a display device indicating that the ultrasonic horn is aligned with the anvil in response to the difference between the amplitude of the first signal and the amplitude of the second signal being less than or equal to the threshold value.

12. The method of claim 7, further comprising emitting a sound from an electrical speaker indicating that the ultrasonic horn is aligned with the anvil in response to the difference between the amplitude of the first signal and the amplitude of the second signal being less than or equal to the threshold value.

* * * * *